United States Patent
Kuhn et al.

(10) Patent No.: US 9,630,568 B2
(45) Date of Patent: Apr. 25, 2017

(54) CAMERA SYSTEM FOR A MOTOR VEHICLE

(71) Applicant: VOLKSWAGEN AG, Wolfsburg (DE)

(72) Inventors: Thorsten Kuhn, Braunschweig (DE); Alexander Kirchner, Braunschweig (DE); Reiner Katzwinkel, Meine (DE)

(73) Assignee: Volkswagen AG, Wolfsburg (DE)

( * ) Notice: Subject to any disclaimer, the term of this patent is extended or adjusted under 35 U.S.C. 154(b) by 406 days.

(21) Appl. No.: 13/920,921

(22) Filed: Jun. 18, 2013

(65) Prior Publication Data

US 2013/0342658 A1 Dec. 26, 2013

(30) Foreign Application Priority Data

Jun. 21, 2012 (DE) .................. 10 2012 012 501

(51) Int. Cl.
| | |
|---|---|
| *B60R 11/04* | (2006.01) |
| *G06T 5/50* | (2006.01) |
| *H04N 13/02* | (2006.01) |
| *G06T 5/00* | (2006.01) |
| *B60R 11/00* | (2006.01) |

(52) U.S. Cl.
CPC .............. *B60R 11/04* (2013.01); *G06T 5/006* (2013.01); *G06T 5/50* (2013.01); *H04N 13/0239* (2013.01); *B60R 2011/0026* (2013.01); *G06T 2207/10021* (2013.01); *G06T 2207/30252* (2013.01)

(58) Field of Classification Search
CPC .... B60R 1/00; G06T 2207/30252; G08G 1/16
USPC ........................................................ 348/47
See application file for complete search history.

(56) References Cited

U.S. PATENT DOCUMENTS

| | | | | |
|---|---|---|---|---|
| 4,124,859 | A * | 11/1978 | Huber ................... | G03B 11/00 396/337 |
| 5,530,420 | A * | 6/1996 | Tsuchiya et al. ............. | 340/435 |
| 7,627,174 | B1 * | 12/2009 | Adams et al. ................. | 382/173 |
| 2003/0169522 | A1 * | 9/2003 | Schofield ................. | B60R 1/04 359/876 |
| 2004/0208497 | A1 * | 10/2004 | Seger et al. .................. | 396/326 |

(Continued)

FOREIGN PATENT DOCUMENTS

| | | |
|---|---|---|
| DE | 10164516 A1 | 7/2003 |
| DE | 202010002827 U1 | 7/2010 |

*Primary Examiner* — Jamie Atala
*Assistant Examiner* — Fabio Lima
(74) *Attorney, Agent, or Firm* — Barnes & Thornburg LLP (57) ABSTRACT

A camera system for acquiring a stereo image of the surroundings of a motor vehicle having two cameras and a control device, the camera system being arranged on the inside of a motor vehicle window and the two cameras looking outward through the motor vehicle window in order to observe the surroundings. Each of the two cameras has a camera-specific camera viewing cone which forms a penetrating cut surface with the window surface. In order to delimit the installation space of the camera system, the camera viewing cone of each camera is delimited by cropping the penetrating cut surface, the cropping of the two penetrating cut surfaces being performed symmetrically relative to the vertical plane of symmetry of the two cameras. The erroneous formation in the image of one camera viewing cone is compensated in the control device by the image information of the other camera viewing cone.

15 Claims, 5 Drawing Sheets

(56) References Cited

U.S. PATENT DOCUMENTS

| | | | |
|---|---|---|---|
| 2005/0001901 A1* | 1/2005 | Eggers | B60R 11/04 348/118 |
| 2005/0030378 A1 | 2/2005 | Stiller | |
| 2006/0082879 A1* | 4/2006 | Miyoshi et al. | 359/462 |
| 2009/0295181 A1* | 12/2009 | Lawlor | B60R 1/12 296/1.11 |
| 2010/0013908 A1* | 1/2010 | Chiu et al. | 348/47 |
| 2011/0050864 A1* | 3/2011 | Bond | 348/51 |
| 2011/0074956 A1* | 3/2011 | Faber | G02B 23/12 348/148 |
| 2012/0139900 A1* | 6/2012 | Matsui | 345/419 |
| 2012/0265416 A1* | 10/2012 | Lu et al. | 701/70 |
| 2012/0269382 A1* | 10/2012 | Kiyohara et al. | 382/103 |
| 2014/0340519 A1* | 11/2014 | Schofield | B60R 1/04 348/148 |

* cited by examiner

CAMERA SYSTEM FOR A MOTOR VEHICLE

PRIORITY CLAIM

This patent application claims priority to German Patent Application No. 10 2012 012 501.1, filed 21 Jun. 2012, the disclosure of which is incorporated herein by reference in its entirety.

FIELD

Disclosed embodiments relate to a camera system arranged on the inside of a window, in particular, the windshield, of a motor vehicle for the purpose of acquiring a stereo image.

BACKGROUND

Camera systems for acquiring the front or rear surroundings of a motor vehicle which are arranged on the inside of the windshield or rear window of the motor vehicle, are known from the prior art and are being used increasingly in assistance systems of modern motor vehicles for measuring and determining the surroundings of the motor vehicle. Such assistance systems are, for example, adaptive speed control systems, also referred to as ACC systems, lane changing assistants, precrash systems, parking systems or combinations of the systems, the listing being merely by way of example.

In order to obtain depth information in a simple way from the data of the surroundings of a camera system, use is made of stereo camera systems from the stereo images of which it is possible to derive depth information, and thereby complete 3D coordinates of the surroundings of the vehicle.

Thus, printed publication US 2005/0030378 A1 discloses a camera apparatus for detecting persons or objects in the front surroundings of a motor vehicle, comprising a stereo recording device having at least two imaging sensors and an evaluation unit for reconstructing the three-dimensional surroundings of the motor vehicle from the data of the imaging sensors. In this case, the imaging sensors can be swiveled about a rotation axis in order also to be able to observe lateral areas of the motor vehicle surroundings. In the case of two imaging sensors, the viewing cones of the two sensors also overlap in a forward direction, while the overlap in the lateral direction increases.

Likewise, printed publication DE 101 64 516 A1 discloses a stereo camera system having at least two video cameras for generating a panoramic image of the area behind the vehicle, the video cameras being assigned fixedly to one another in space and arranged directly near to one another. The two video cameras are in this case accommodated in a suitable housing, the outer shape of the housing being a function of the video cameras and of the installation space.

Furthermore, printed publication DE 20 2010 002 827 U1 discloses a camera monitoring device having two cameras arranged in a housing for the purpose of respectively acquiring images of the rear area behind a vehicle, the housing having a housing window. In this case, one camera is directed to the ground during reversing operation in order to monitor the nearby area, while the other camera monitors the rear far off region in a horizontal direction.

Given an arrangement of a stereo camera system having two cameras on the windshield of a motor vehicle, the camera system is arranged in a housing at the level of the interior rear-view mirror, the two cameras seeing through the windshield in a respective viewing cone. In this case, the camera-specific viewing cones are directed substantially horizontally or slightly inclined to the pavement. The penetration of a viewing cone of a camera through the windshield forms a trapeze-shaped cut surface inside the windshield. In order to avoid disturbances of the recorded images, caused for example by reflections at the windshield, the area outside the two trapeze-shaped cut surfaces is covered. This covering is effected by printing black appropriate areas of the windshield outside the trapeze-shaped cut surfaces, and by internally covering the stereo system with suitable geometric dimensions.

As the driver sees it, the view around the covering is disturbing. Thus, for example, the perceptibility of traffic lights to the side on the edge of the road is reduced, since the driver must change his head posture, and thus the direction of view, such that he looks past the covering, as it were.

SUMMARY

Disclosed embodiments reduce the installation space required to build a stereo camera system on the inside of a window in the vehicle in order to enable the driver to have a better view of the vehicle surroundings.

This is achieved by a camera system for acquiring a stereo image. Further embodiments are the subject matter of the subclaims.

BRIEF DESCRIPTION OF THE DRAWINGS

The disclosed embodiments are explained below with the aid of the drawings, in which.

DETAILED DESCRIPTION OF THE DISCLOSED EMBODIMENTS

The camera system for acquiring a stereo image of the surroundings of a motor vehicle comprises two cameras and a control device, the camera system being arranged on the inside of a motor vehicle window, in particular the windshield, and the two cameras looking outward through the motor vehicle window in order to observe the surroundings. Each of the two cameras has a camera-specific camera viewing cone which forms a penetrating cut surface with the window surface. In order to delimit the installation space of the camera system, the camera viewing cone of each camera is delimited by a cropping of the penetrating cut surface, the cropping of the two penetrating cut surfaces being performed symmetrically relative to the vertical plane of symmetry between the two cameras. The erroneous information, caused by the cropping, in the image of one camera viewing cone is compensated in the control device by the image information, symmetrical thereto, of the other camera viewing cone. As already mentioned, the result of this is that the installation space of the camera system is substantially reduced, and the driver's view is less impaired. It is not possible to derive any stereo information from the two cropping areas of the penetrating cut surface of each cutting cone. However, since the cropping of the penetrating cut surface always takes place at the edge of a contour thereof, this is of no significance for the essential, middle area of the surroundings of the vehicle, whether in a forward or backward direction.

The cropping of the penetrating cut surface may be performed by a cutting curve which runs in the interior of the penetrating cut surface and forms two intersection points with the contour, that is to say the periphery, of the penetrating cut surface. In other words, an area which is delimited by the cutting curve and the contour section running between two intersection points is cut out from the penetrating cut surface. An appropriate area is masked out in this way from the camera viewing cone of each camera.

The cutting curve between the two intersection points with the contour of the penetrating cut surface may be formed by a strictly monotonic function. In a manner of speaking, this produces a "smooth" edge of the cut-out area, that is to say of the cut. Furthermore, it is also possible for the transition of the cutting curve into the contour of the penetrating cut surface to require a continuous differentiability at the intersection point in order to require a smooth transition of the cutting curve into the contour outside the cut.

The penetrating cut surface may have the shape of a trapeze. The trapeze shape is a consequence of the shape of the viewing cone, as well as of the angle between the vehicle window and the viewing cone.

Given the above disclosed embodiment of the penetrating cut surface in a trapeze shape, the left-hand penetrating cut surface in the viewing direction of the camera system is cropped in the area of the outer, left-hand lower corner of the trapeze, and the right-hand penetrating surface is cropped in the region of the outer, right-hand lower edge of the trapeze. In other words, the cropping is performed in an outer area of the respective penetrating surfaces, in an area which cuts out an image area laterally near the motor vehicle such that during an observation of the front surroundings of the vehicle only image areas located laterally near the vehicle are masked out.

The cutting curve of the right-hand penetrating surface in the trapeze shape may form a monotonically decreasing function, and that of the right-hand penetrating surface in the trapeze shape forms a monotonically increasing function in conjunction with masking out of the outer, lower corner areas of the penetrating surfaces.

The cutting curve running between the two intersection points may be formed by a convexly curved curve. Because of the convex curvature, an optimum is achieved between the visibility of the surroundings for the driver and the area of the 3D data of the surroundings.

The cropping of the penetrating cut surface may be formed by a black printing of the appropriate motor vehicle window. In other words, each penetrating cut surface is cut by printing the cropped area black.

The camera system may have a housing for holding the two cameras, and an inner covering. Here, the housing serves to reliably fasten the cameras, and the inner covering directed inward into the passenger space serves, on the one hand, to mask out light originating from the interior of the vehicle and, on the other hand, for the visually attractive configuration of the camera system.

Figure 1:
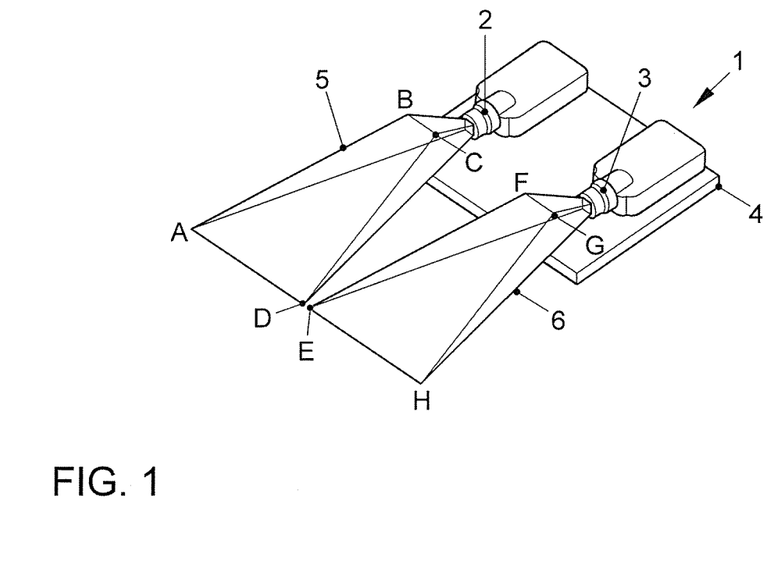
FIG. 1 shows a camera system having two cameras.

FIG. 1 shows a camera system 1 in a schematic, perspective illustration. The camera system 1 comprises two cameras 2, 3, which are mounted on a housing 4. Each camera 2, 3 has a camera viewing cone 5, 6 which defines the field of view of the appropriate camera 2, 3. A camera viewing cone 5, 6 has a rectangular cross section caused by the image sensor (not illustrated) of the camera 2, 3. Because of the arrangement of the camera system 1 on the inside of a vehicle window, the intersection of the upper camera viewing cone 5 in FIG. 1 with the vehicle window produces a trapeze having the corner points A, B, C, D, and the intersection of the lower viewing cone 6 with the vehicle window produces the trapeze E, F, G, H. The upper camera 2 of FIG. 1 is referred to below as the right-hand camera 2, the lower camera 3 as the left-hand camera 3. The designations left hand and right hand are based on the viewing direction of the cameras 2, 3.

Figure 2:
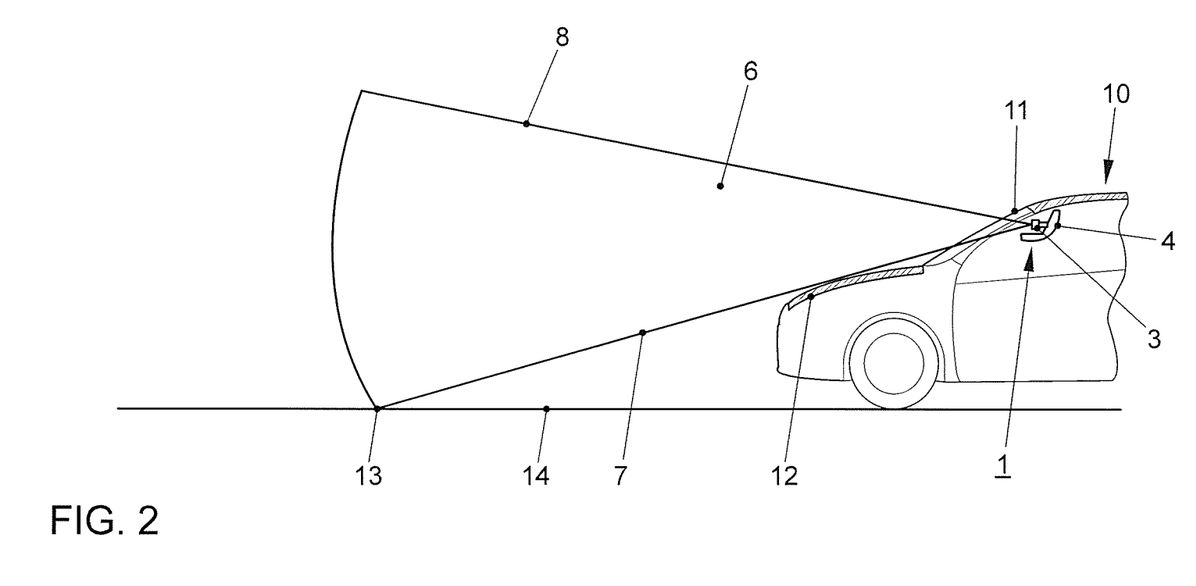
FIG. 2 shows the arrangement of the camera system on the inside of a windshield of a motor vehicle, in a schematic illustration.

FIG. 2 shows the arrangement of the camera system 1 of FIG. 1 in a motor vehicle 10 in a schematic illustration. The camera system 1 is arranged in the motor vehicle 10 on the inner side of the windshield 11 at the level of the interior mirror (not illustrated), there being visible in the lateral illustration of FIG. 2 the left-hand camera 3 of the camera system 1, the camera being arranged and fastened in the housing 4 of the camera system 1. The viewing cone 6 of the left-hand camera 3 looks outward through the windshield 11 in order to observe the surroundings ahead of the motor vehicle 10. The viewing cone 6 is aligned such that it is directed forward substantially in the horizontal direction over the engine hood 12 of the motor vehicle 10. In this case, the lower limit 7 of the viewing cone 6 is incident on the pavement 14 at a point 13, thereby defining a distance which is fixed by the position of the camera system in the vehicle 10 and the engine hood 12.

Figure 3:
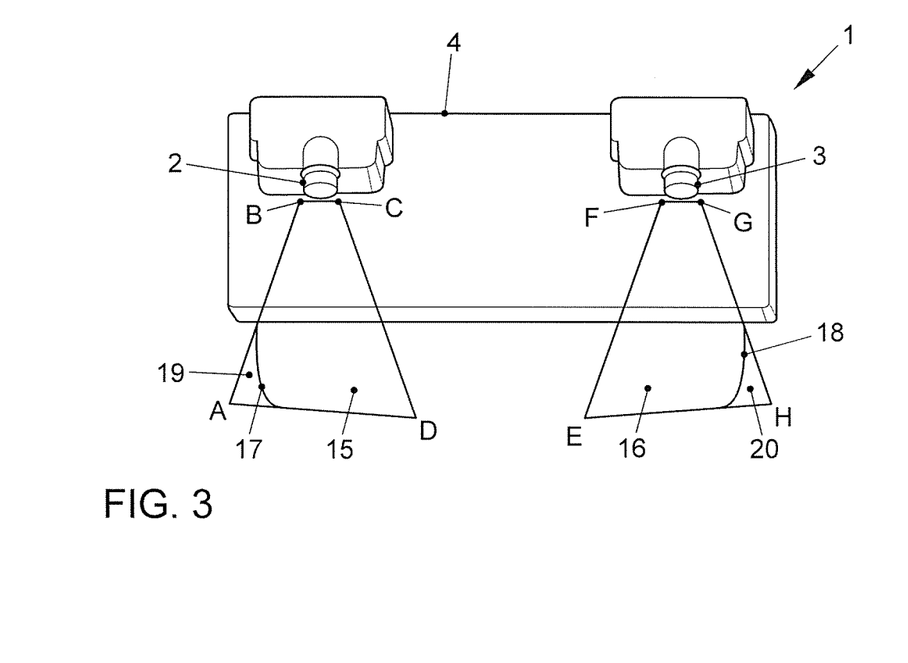
FIG. 3 shows a plan view of the arrangement of the camera system, with the penetrating cut surface of the vehicle window and its cuts.

FIG. 3 shows the arrangement of the camera system 1 on the inside of a windshield 11 of a motor vehicle 10 of FIG. 2 in plan view from outside. The two cameras 2, 3 which are fastened in the housing 4 and the viewing cones 5, 6 of which (not illustrated) respectively form a penetrating cut surface 15, 16 with the windshield (not illustrated) can be seen. In this case, the penetrating cut surface 15 of the right-hand camera 2 has the shape of a trapeze with the corner points A, B, C, D, and the penetrating cut surface 16 of the left-hand camera 3 likewise forms a trapeze on the windshield with the corner points E, F, G, H. The surfaces of the penetrating cut surfaces 15, 16 have the curvature of the windshield in this case. In other words, the surfaces of the penetrating cut surfaces 15, 16 need not be flat but may also be slightly curved.

In order to reduce the space required to install the camera system, which also contributes to improving the driver's view to the outside, the penetrating cut surfaces 15, 16 are cropped in the surroundings of the outer lower trapeze corner points A, H by cutting curves 17, 18, the result being cropped areas 19 and 20.

Figure 4:
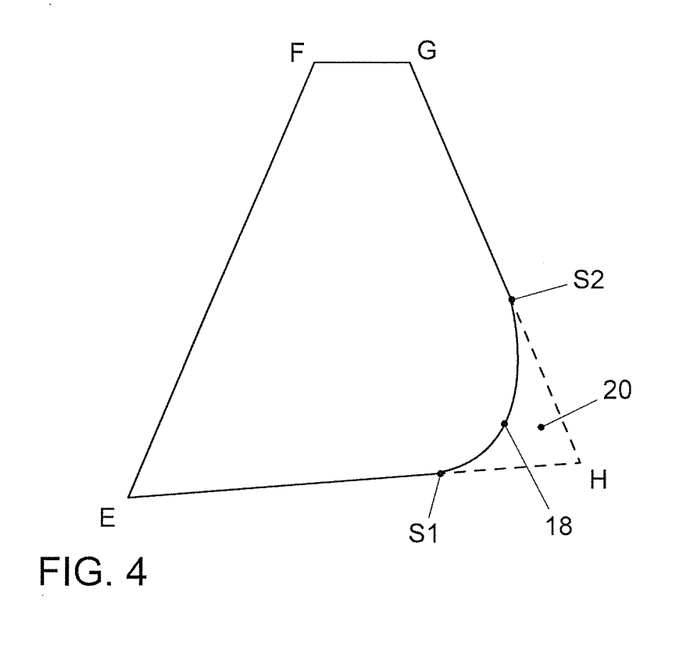
FIG. 4 shows a penetrating cut surface with a cut, in a schematic illustration.

FIG. 4 shows the cropping of a penetrating cut surface with the aid of the example of the penetrating cut surface 16 of the left-hand camera 3 in greater detail. The trapeze shape, formed by the corner points E, F, G, H, of the penetrating cut surface 16 of the left-hand camera 3 (not illustrated) is cropped at its lower outer corner point H by a cutting curve 18 so as to form two intersection points S1 and S2 with the contour EFGH of the penetrating cut surface 16, specifically an intersection point S1 with the lower contour EH, and an intersection point S2 with the outer lateral contour GH. This gives rise to a cropped area 20 which is defined by the points S1, S2 and H, the area 20 being masked out on the windshield from the image of the camera 3 responsible for the penetrating cut surface 16, for example by an appropriate black coloration. Corresponding measures are taken for the penetrating cut surface of the right-hand camera in the area of the lower outer corner point A. The cutting curve 18 of the example of FIG. 4 shows a strictly monotonic behavior and is convex. Although not mandatory, a continuous differentiability may also be required for the transition of the cutting curve 18 into the contour EFGH of the penetrating cut surface 16 at the intersection points S1 to S2.

Figure 5:
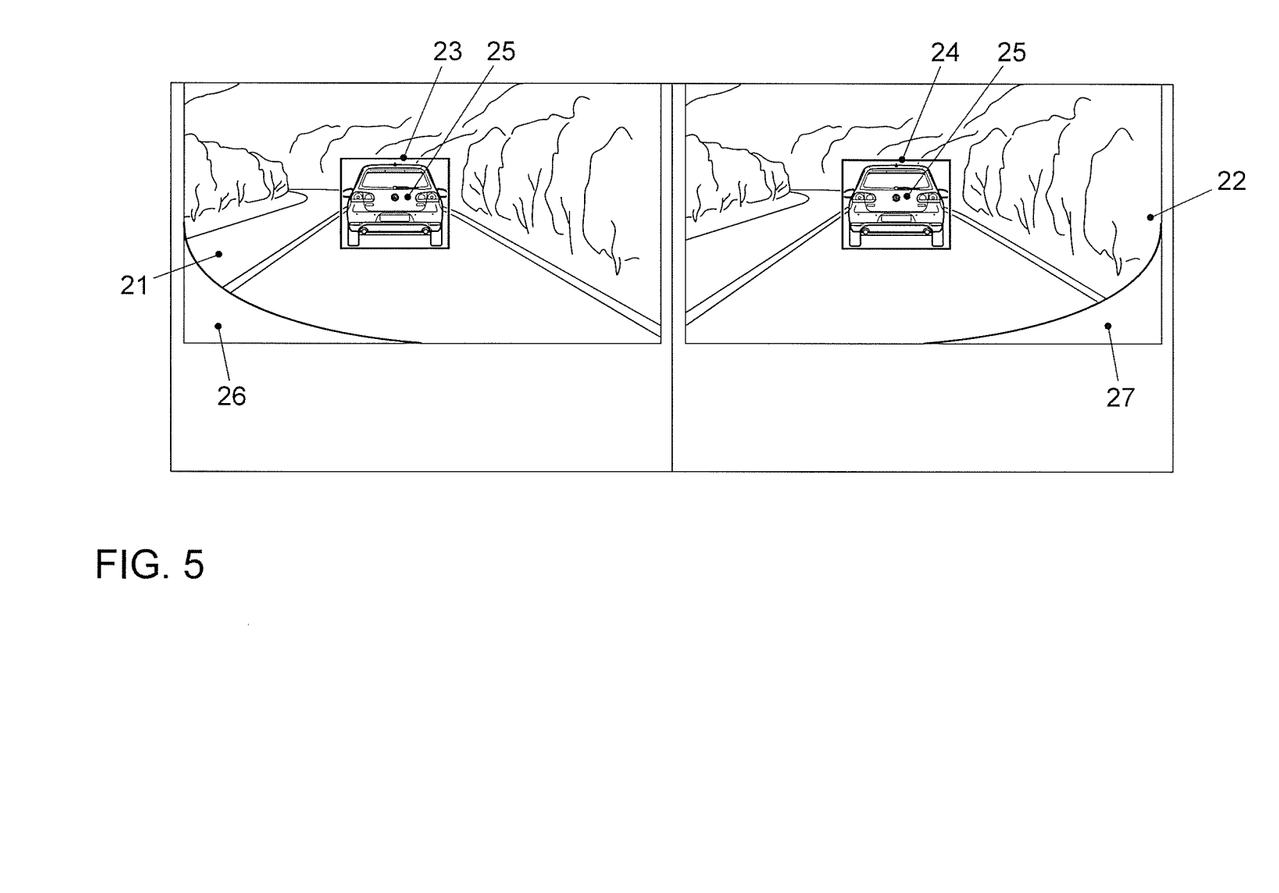
FIG. 5 shows an illustration of the resulting camera image.

FIG. 5 shows the images 21 of the left-hand camera 3 and the image 2 of the right-hand camera 2 as they have been recorded by the respective viewing cone of the cameras 2, 3. A further vehicle 25 driving ahead of the motor vehicle is illustrated in the rectangle 23 of the left-hand image 21, while the same vehicle 25 driving ahead is illustrated in the marked rectangle 24 of the image 22 of the right-hand camera 3. Visible in the left-hand lower corner of the left-hand camera image 21 is a masked-out area 26, and in the right-hand lower corner of the right-hand camera image 22 there can be seen a masked-out area 27, which comes from the cropping of the penetrating cut surfaces 15, 16. It can be seen that the masked-out area 26 of the left-hand image 21 is present in the right-hand image 22. Likewise, the masked-out area 27 of the right-hand image 22 is present in the left-hand image 21. When the two images 21, 22 are combined to form a common image, it is therefore possible to add the masked-out areas 26, 27, though there is no depth information present in the added areas. However, since unimportant edge areas are concerned, it is possible to dispense with the depth information in the masked-out areas 26, 27.

LIST OF REFERENCE SYMBOLS

1 Camera system
2 Right-hand camera
3 Left-hand camera
4 Housing
5 Camera viewing cone
6 Camera viewing cone
7 Lower limit of the viewing cone
8 Upper limit of the viewing cone
10 Motor vehicle
11 Windshield
12 Engine hood
13 Point of incidence
14 Pavement
15 Penetrating cut surface
16 Penetrating cut surface
17 Cutting curve
18 Cutting curve
19 Cropped area
20 Cropped area
21 Left-hand image
22 Right-hand image
23 Marked rectangle
24 Marked rectangle
25 Further vehicle
26 Masked-out area
27 Masked-out area
A Trapeze corner point
B Trapeze corner point
C Trapeze corner point
D Trapeze corner point
E Trapeze corner point
F Trapeze corner point
G Trapeze corner point
H Trapeze corner point
ABCD Trapeze contour on the right
EFGH Trapeze contour on the left
EG Lower trapeze contour on the left
GH Lateral trapeze contour on the left

The invention claimed is:

1. A camera system for acquiring a stereo image of the surroundings of a motor vehicle comprising two cameras and a control device arranged on the inside of a motor vehicle window,
wherein the two cameras look outward through the motor vehicle window to observe the motor vehicle surroundings, each camera having a camera-specific camera viewing cone which forms a penetrating cut surface with the window surface,
wherein the camera viewing cone of each camera is delimited by a physically masked out portion of the penetrating cut surface of the motor vehicle window, the physically masked out portions of the two penetrating cut surfaces are symmetric relative to the vertical plane of symmetry of the two cameras, and erroneous information caused by the physically masked out portion, in an image of one camera viewing cone is compensated for in the control device by image information, symmetrical thereto, of the other camera viewing cone,
wherein the physically masked out portion of a penetrating cut surface is formed by a cutting curve, which runs in an interior of the penetrating cut surface and forms two intersection points with a contour of the penetrating cut surface.

2. The camera system of claim 1, wherein the cutting curve between the two intersection points with the contour is formed by a strictly monotonic function.

3. The camera system of claim 1, wherein the penetrating cut surfaces have the shape of a trapeze.

4. The camera system of claim 3, wherein physically masked out portion of a left-hand penetrating cut surface in the viewing direction of the camera system relates to an outer, left-hand corner of the trapeze, and physically masked out portion of a right-hand penetrating surface relates to an outer, right-hand corner of the trapeze.

5. The camera system of claim 1, wherein the cutting curve of the right-hand penetrating surface forms a monotonically decreasing function in plan view and the cutting curve of the left-hand cutting surface forms a monotonically increasing function in plan view.

6. The camera system of claim 1, wherein the cutting curve running between the two intersection points is a convexly curved curve.

7. The camera system of claim 1, wherein the physically masked out portions are formed by a black printing on the motor vehicle window.

8. The camera system of claim 1, wherein the camera system has a housing for holding the two cameras and an inner covering.

9. A method for acquiring a stereo image of the surroundings of a motor vehicle having a camera system with two cameras and a control device the camera system being arranged on the inside of a motor vehicle window, the method comprising:
observing the motor vehicle surroundings using the two cameras to look outward through the motor vehicle window, wherein each camera has a camera-specific camera viewing cone which forms a penetrating cut surface with the window surface,
delimiting the camera viewing cone of each camera solely by a physical masking off a portion of the penetrating cut surface, the physical masked off portions of the two penetrating cut surfaces being performed symmetrically relative to the vertical plane of symmetry of the two cameras; and compensating for erroneous information caused by the physical masked off portions in an image of one camera viewing cone, in the control device by image information, symmetrical thereto, of the other camera viewing cone, wherein the physical masking off of a penetrating cut surface is performed by a cutting curve, which runs in an interior of the penetrating cut surface and forms two intersection points with a contour of the penetrating cut surface.

10. The method of claim 9, wherein the cutting curve between the two intersection points with the contour is formed by a strictly monotonic function.

11. The method of claim 9, wherein the penetrating cut surfaces have the shape of a trapeze.

12. The method of claim 11, wherein physical masking off of a left-hand penetrating cut surface in the viewing direction of the camera system relates to an outer, left-hand corner of the trapeze, and physical masking off of a right-hand penetrating surface relates to an outer, right-hand corner of the trapeze.

13. The method of claim 9, wherein the cutting curve of the right-hand penetrating surface forms a monotonically decreasing function in plan view and the cutting curve of the left-hand cutting surface forms a monotonically increasing function in plan view.

14. The method of claim 12, wherein the cutting curve running between the two intersection points is a convexly curved curve.

15. The method of claim 9, wherein the physical masking off is formed by a black printing on the motor vehicle window.

* * * * *